United States Patent
Brooks

(10) Patent No.: US 6,352,144 B1
(45) Date of Patent: Mar. 5, 2002

(54) FLOW-CONTROL VALVE AND DAMPER

(75) Inventor: Douglas Alan Brooks, London (GB)

(73) Assignee: Advanced Fluid Systems Limited, London (GB)

(*) Notice: Subject to any disclaimer, the term of this patent is extended or adjusted under 35 U.S.C. 154(b) by 0 days.

(21) Appl. No.: 09/308,081

(22) PCT Filed: Nov. 18, 1997

(86) PCT No.: PCT/GB97/03112

§ 371 Date: May 12, 1999

§ 102(e) Date: May 12, 1999

(87) PCT Pub. No.: WO98/22727

PCT Pub. Date: May 28, 1998

(30) Foreign Application Priority Data

Nov. 21, 1996 (GB) .............................. 9624220
Sep. 24, 1997 (GB) .............................. 9720217

(51) Int. Cl.[7] .................................. F16F 9/53
(52) U.S. Cl. ............... 188/267.2; 267/140.14; 137/909; 251/129.17
(58) Field of Search ............. 188/267.2, 267.1, 188/267, 322.15; 267/140.14, 141.2, 35, 219; 137/909, 806, 807, 827; 251/129.17, 129.01, 331

(56) References Cited

U.S. PATENT DOCUMENTS

| | | | | |
|---|---|---|---|---|
| 2,661,596 A | * | 12/1953 | Winslow | ...................... 60/52 |
| 4,790,522 A | | 12/1988 | Drutchas | |
| 4,887,699 A | | 12/1989 | Ivers et al. | |
| 4,958,704 A | * | 9/1990 | Leiber et al. | ............. 188/267.2 |
| 5,284,330 A | * | 2/1994 | Carlson et al. | ......... 267/140.14 |
| 5,630,440 A | * | 5/1997 | Knutson et al. | .............. 137/82 |
| 6,095,486 A | * | 8/2000 | Ivers et al. | ............ 251/129.01 |
| 6,131,709 A | * | 10/2000 | Jolly et al. | ............... 188/267.2 |

FOREIGN PATENT DOCUMENTS

| | | |
|---|---|---|
| EP | 544405 | 6/1993 |
| EP | 547866 | 6/1993 |
| GB | 2267140 | 11/1993 |
| JP | 63076973 | 7/1988 |
| JP | 01250601 | 5/1989 |
| WO | WO 94/11640 | 5/1994 |
| WO | WO 94/21938 | 9/1994 |
| WO | WO 96/26377 | 8/1996 |

* cited by examiner

*Primary Examiner*—Pam Rodriguez
(74) *Attorney, Agent, or Firm*—Ohlandt, Greeley, Ruggiero & Perle, L.L.P.

(57) ABSTRACT

A flow control valve assembly for an electro-rheological (ER) fluid has an inlet port, an outlet port and a flow path for ER fluid extending between the inlet and outlet ports. A flow control valve is disposed in the flow path and includes a resilient diaphragm, which is acted upon by pressure in the flow path and which is moveable towards and away from the free end of a hollow boss. A flow restrictor in the form of an annular passage defined by electrodes is disposed in the flow path upstream of the flow control valve. An electric field is applied to the ER fluid as it passes between the electrodes to enable control of the resistance to flow of the ER fluid therethrough, thereby enabling control of the pressure drop across the diaphragm. A bypass passage defining a pressure relief valve is disposed downstream of the flow restrictor and permits flow between the inlet and outlet ports when the flow control valve is closed.

15 Claims, 4 Drawing Sheets

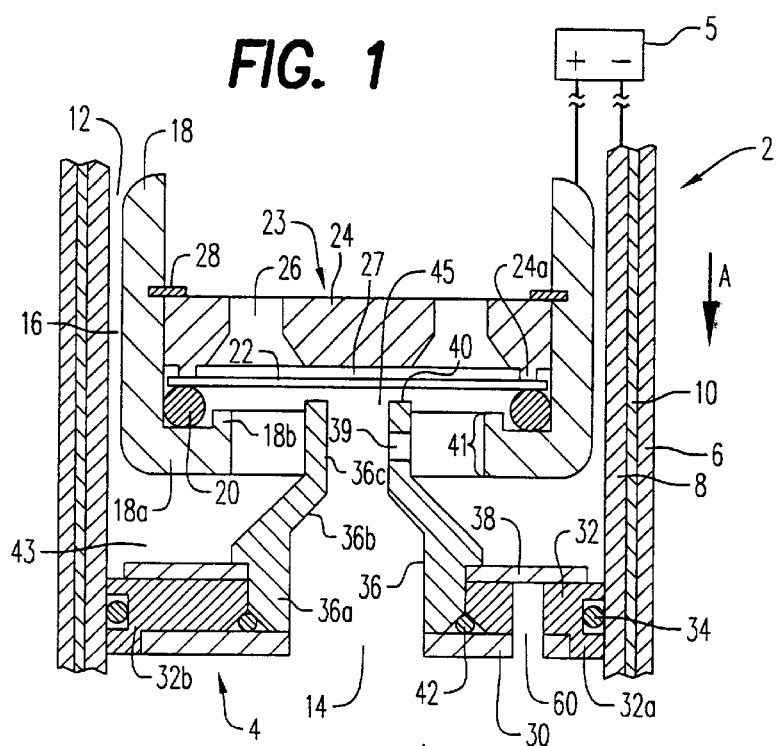
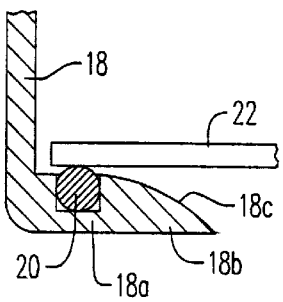
FIG. 1
FIG. 1a
FIG. 2

FLOW-CONTROL VALVE AND DAMPER

This invention relates to a flow-control valve assembly and, in one aspect, is particularly concerned with a flow-control valve assembly for controlling the flow of a field-responsive fluid bidirectionally. This invention also relates to dampers incorporating such valve assemblies and to the use of such dampers.

Examples of field-responsive fluids (hereinafter simply called FR fluids), are electro-rheological fluids (hereinafter simply called ER fluids), whose rheology can be changed by an electric field, and magneto-rheological fluids (hereinafter simply called MR fluids), whose rheology can be changed by a magnetic field. ER fluids exhibit a characteristic change in viscosity or apparent viscosity when an electric field is applied; and in the case of MR fluids, a similar effect is observed when a magnetic field is applied.

For effecting flow control in ER fluids, it is commonly the practice to pass such ER fluid along an extended path between electrodes and to apply an electric field to the ER fluid so as to control its resistance to flow and therefore the pressure drop across the restrictor thereby defined. Similarly, flow control of MR fluids can be controlled by applying a magnetic field. The rate at which energy can be dissipated through the ER or MR effect is inter alia proportional to the volume of ER or MR fluid in the appropriate electric or magnetic field. In practice, this often means that devices using such fluids are too large for certain applications or too large to be economically feasible, both in terms of the volume of FR required and the large power demands necessary, particularly where high pressure drops are required.

WO94/21938 discloses a flow-control valve suitable for use with ER fluids wherein a first flow restrictor including a resilient diaphragm is disposed in a flow path between an inlet port and an outlet port and a second flow restrictor is disposed in the flow path upstream of the first flow restrictor so as to affect the pressure drop across the diaphragm. The second flow restrictor includes electrodes for applying an electric field as it passes through the second flow restrictor, to enable control of the resistance to flow of the ER fluid therethrough and thereby to enable control of the pressure drop across the diaphragm.

It has been found in practice that the control valve disclosed in WO94/21938 can be difficult to control and tends to be either fully closed or fully open, with little repeatable control between these two states. Additionally, the majority of the pressure drop across the diaphragm is found to be due to pressure drops throughout the entire flow path, rather than as a result of fluid flow through the ER valve section. This can lead to difficulties in ensuring a controlled and well-defined pressure drop across the diaphragm.

For use in a damper, it is important that this flow-control valve does not remain completely closed when the damper experiences a large force, since there would be no damping and the lack of pressure relief may give rise to a dangerous situation.

It is an object of the first aspect of the present invention to provide a field-responsive-fluid-control valve assembly which obviates or mitigates these problems.

According to said first aspect of the present invention, there is provided a flow-control valve assembly for a field-responsive (FR) fluid, said valve assembly comprising:

an inlet port;
an outlet port;
a flow path for FR fluid extending between the inlet and outlet ports;
a flow-control valve disposed in the flow path between the ports, said flow-control valve including a valve member which is moveable between a first position in which the valve is open, and a second position in which the valve is closed;
a flow restrictor disposed in the flow path upstream of the flow-control valve, said flow restrictor including means for applying a field to the FR fluid as it passes through the flow restrictor to enable control of the resistance to flow of the FR fluid therethrough, so as to affect a pressure drop across the valve member, and thereby to control movement of the valve member between its first and second positions; and
a bypass passage defining a pressure-relief means, which can permit flow between inlet and outlet ports when the valve member is in the second position, said bypass passage being disposed downstream of the flow restrictor.

When an MR fluid is used, the flow rate of MR fluid passing through the valve assembly can be controlled by a magnetic field that is controlled by the applied electric current. When an ER fluid is used, the flow rate of ER fluid passing through the valve assembly can be controlled by an electric field that is controlled by the applied voltage. A combination of ER and MR fluids may be used, in which case control will be provided by both the voltage and current signals.

The means for applying an electric field to the ER fluid may be of the type described in WO94/21938. The means for applying a magnetic field to the MR fluid may include a permanent magnet or an electromagnet. In the case of an electromagnet, a field of varying intensity can be applied by adjusting the current passing through the electromagnet.

Preferably, the valve member is resiliently biased into its first position and, more preferably is a resilient diaphragm, for example a diaphragm of the type described in WO94/21938.

The flow-control valve may additionally comprise means for varying the resistance to deformation of the diaphragm. Preferably said means comprises a diaphragm support which is shaped so that, in use, the effective diameter of the diaphragm is changed, preferably reduced, as it is deformed.

The size of the bypass passage (cross-sectional area and length) determines the maximum energy that the flow-control valve assembly can dissipate for a given flow-control valve. The bypass passage may incorporate a pressure-relief valve which may be a cantilevered spring flap. The force on the pressure-relief valve is determined inter alia by the pressure drop across the valve member as it closes. Advantageously, the threshold opening pressure of the pressure-relief valve and the size of the bypass passage can be varied from one application to another, in order to provide different pressure-relief profiles. For example, in the case of a cantilevered spring flap, the strength of the spring may be such that the flap gradually opens as the valve member closes. Alternatively, a stronger spring may permit the valve member to close completely before the flap opens.

According to a second aspect of the present invention, there is provided a damper comprising a cylinder in which a piston with piston rod is slidable, an FR fluid-flow passage interconnecting opposite sides of the piston, and a flow-control valve assembly controlling flow of FR fluid through said fluid-flow passage, wherein the flow-control valve assembly is in accordance with said first aspect of the present invention.

Preferably said piston incorporates said flow-control valve assembly.

Said damper may include first and second flow-control valve assemblies adjacently disposed and orientated so that they respectively control flow of FR fluid through said fluid-flow passage in opposite directions, wherein at least one of said flow-control valve assemblies is in accordance with said first aspect of the present invention. Additionally, said flow-control valve assemblies may each include a one-way valve disposed so as to permit flow into the FR fluid-flow passage.

Preferably said flow-control valve assemblies share a common valve member. Most preferably, the common valve member is a resilient diaphragm which is moveable between a first position in which both flow-control valves are open, and second and third positions in which only th e first flow-control valve is open and only the second flow-control valve is open, respectively.

Advantageously, the flow-control valve assemblies can be constructed to have different flow-control characteristics and/or can be controlled, in order to present different damping effects on the compression and extension strokes of the piston.

According to a third aspect of the present invention, there is provided a fluid-flow control device, comprising a body having an FR fluid-flow passage therein, and control means to apply a field across the passage so as to vary the resistance to flow of the FR fluid through the passage, wherein the control means is arranged to apply a variable field pulsing between relatively high and low states.

Preferably said high and low states are on and off states, ie the power supply is digital. Preferably said control means incorporates means to allow the width of the pulses to be varied.

Advantageously, no control is required other than for the duration of the pulses, since the magnitude and smoothness of the pulses are not critical, making the power supply simple and inexpensive to produce.

The pulsed field may be provided by an alternating or pulsed electric voltage to control an ER fluid or an alternating or pulsed electric current to control an MR fluid.

Preferably, a flow-control valve assembly according to said first aspect of the present invention is controlled by a pulsed field in accordance with said third aspect of the present invention. Since the damping force is determined by the width of the pulses, there is no need to control the valve member accurately during transition between its first and second positions.

Advantageously, such a pulsed field can be used to enable the valve member to oscillate in use between its first and second positions. By varying the width of the pulses, any value of damping force can be developed between the minimum and maximum of the flow-control device.

Preferably, a damper according to said second aspect of the present invention uses an ER fluid and is controlled by a pulsed voltage in accordance with said third aspect of the present invention.

Advantageously, a much smaller flow-control valve can be used, reducing power consumption significantly. In addition, weaker FR fluids may be used, since the FR fluid is required only to operate the flow-control valve, not to provide the total damping force. The high energy loss dependent on the length and cross-sectional area of the bypass passage is independent of variations in temperature. The overall effect is that the damper mimics a manually controlled or solenoid-controlled dual-orifice damper, but with a significantly faster response. Thus it is to be understood that the damping force can be altered within a single stroke of the damper.

The width of the pulses may be determined by the force experienced by the damper, so that for a small force the "on" pulses are short and for a large force they are long. Alternatively, the width of the pulses may be linked to the length of travel of the piston in the cylinder, with longer "on" pulses provided for longer movements of the piston. In either case, it is possible to balance a sufficient degree of damping with smooth motion of the piston.

A damper according to the second aspect of the present invention may be used in an agricultural vehicle seat assembly. Further uses for such a damper include prosthetic limbs, bicycle or motorcycle suspension units, lateral or vertical rail rolling stock damping, primary automotive suspensions, vehicle cab, ambulance and motor vehicle isolation, washing machine drum rotation damping, high speed centrifuge balancing and exercise equipment such as rowing machines and multigyms.

Embodiments of the present invention will now be described, by way of example, with reference to the accompanying drawings, in which:

FIG. 1 is an axial section through part of a damper according to the present invention;

FIG. 1a shows a detail modification of the damper illustrated in FIG. 1;

FIG. 2 is an axial section through part of a bidirectional damper according to the present invention;

Figure 3:
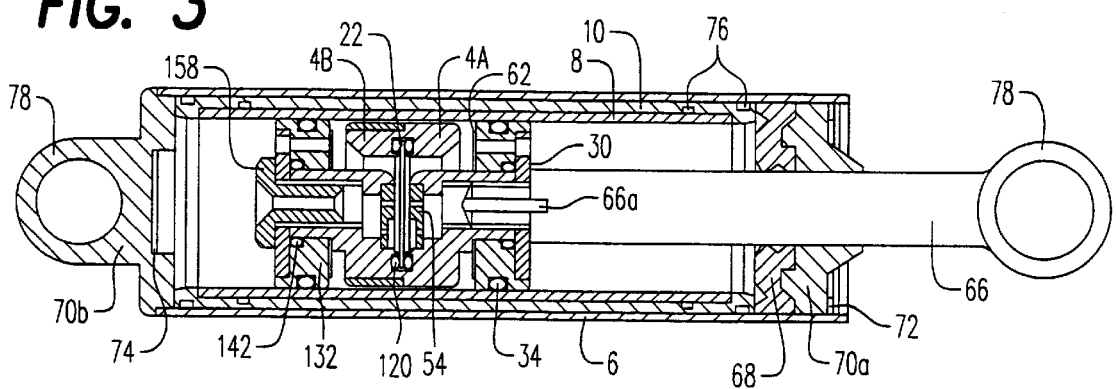
FIG. 3 is an axial section of the whole damper illustrated in part in FIG. 2.

Referring now to FIG. 1, the illustrated damper comprises a closed-ended cylinder 2, a piston 4 which is slidable on a piston rod (not shown) within the cylinder 2 and which is biased by a spring (not shown) in the direction of arrow A, and a control device 5 capable of applying a pulsed voltage across first and second electrodes 8 and 18. The piston 4 includes a flow-control valve assembly wherein fluid flow is controlled through the latter when the piston 4 is moved against the action of the spring. Cylinder 2 has an outer wall 6 and an inner sleeve forming the first electrode 8, the outer wall 6 and the first electrode 8 being separated by an intermediate electrically-insulating plastics sleeve 10.

The flow-control valve assembly comprises an annular port 12, a central port 14 and a flow path therebetween. A flow restrictor in the form of an annular passage 16, located in the flow path, is defined between the electrodes 8 and 18. The second annular electrode 18 has an inwardly extending lip 18a and inner rim 18b thereupon. A seating recess is defined by the annular surface 18, lip 18a and rim 18b, in which an O-ring 20 is located. The O-ring 20 provides support for a resilient flat diaphragm 22 located within the annular electrode 18. A pressure-fluctuation damper and flow diffuser 23 locates the diaphragm 22 and comprises a circular plate 24 having an annular rib 24a which contacts the diaphragm 22 and which is aligned with the O-ring 20. The plate 24 has a ring of orifices 26 extending axially therethrough, each orifice 26 having a circular cross section whose diameter increases from a mid-region of the plate 24 towards the diaphragm 22. The orifices 26 communicate with a common chamber 27 disposed inwardly of the rib 24a and between the plate 24 and the diaphragm 22. A spring retaining clip 28 abuts the plate 24 and serves to ensure that the lip 18a of the second electrode 18, O-ring 20 and diaphragm 22 are sealingly engaged, so that no fluid can leak around the diaphragm 22.

An end surface of the piston 4 in which the port 14 is provided is defined by an annular support plate 30 and a rim 32a of an overlying plastics, electrically-insulating, annular member 32. The member 32 is a sliding fit within the inner sleeve 8 of the cylinder 2 and sealed therewith by an O-ring 34 located in an outer peripheral groove 32b in the member 32. A central hollow boss 36 has a larger diameter section 36a which is stepped to receive an annular plastics flap-valve member 38. The larger diameter section 36a is seated on the support plate 30 and secured thereto, e.g. by welding, so as to secure the members 32 and 38 together in mutual abutment, with the flap-valve member 38 closing a return passage 60 extending through both the annular member 32 and the plate 30. A smaller diameter section 36c of boss 36 is positioned inside the lip 18a of the second electrode 18, has a bypass passage 39 defined by a hole therethrough, and a free end 40 which provides a seating surface for the diaphragm 22 when the diaphragm 22 is deformed under pressure. The hollow region within the smaller diameter area 36c of the boss 36 defines an outlet passage 45 for the diaphragm valve. The section 36c is spaced inwardly of the lip 18a and is secured thereto by a series of spaced radially extending flanges 41, so that the flow path extends between the flanges 41 whereby to provide communication between the interior of the hollow boss 36 and a chamber 43 (and hence the annular passage 16) via the free end 40 and the bypass passage 39. The smaller diameter section 36c is connected to the larger diameter section 36a by an intermediate frusto-conical section 36b. A sealing O-ring 42 prevents leakage of fluid between the boss 36 and support plate 30.

In use, the cylinder 2 is filled with ER fluid so as to surround and fill the piston 4. When a force is applied to the damper causing the piston 4 to move along the cylinder 2 against the action of the spring in a direction opposite to arrow A, there is motion of the ER fluid relative to the piston 4 in the direction of arrow A. The fluid passes through the annular port 12, acting as an inlet port, to the chamber 43 via the annular passage 16. From there it passes into the hollow boss 36 via the space between the diaphragm 22 and free end 40 of the boss 36 which define a diaphragm valve, and via the bypass passage 39. Fluid exits the fluid-flow control valve assembly through the port 14, acting as an outlet port. It will therefore be understood that the overall resistance to flow of the fluid between the port 12 and the port 14 determines the degree of damping.

At the same time, fluid passes through the pressure-fluctuation damper and flow diffuser 23 into common chamber 27 and exerts a pressure on the upstream surface of the diaphragm 22 (the upper surface as viewed in FIG. 1). The locations and shapes of the orifices 26 serve to limit pressure variation across the upstream surface of the diaphragm 22. As a result of the restricted flow through the annular passage 16, there is a pressure drop across the diaphragm 22. It will be understood that the size of the pressure drop is dependent inter alia upon the length and cross-sectional area of the annular passage 16 and the speed at which the piston 4 is moving. At high speed, i.e. large applied force, the diaphragm 22 becomes firmly seated against the free end 40 of the boss 36, so closing the diaphragm valve. The piston 4 will not become completely locked however, because fluid can still pass through the bypass passage 39. The cross-sectional area and length of the bypass passage 39 affects the maximum energy that can be dissipated by the fluid-flow control valve assembly when the diaphragm valve is closed.

When a voltage is applied by the control device 5 across the electrodes 8 and 18, the viscosity of the ER fluid is increased while it passes through the annular passage 16, thereby increasing the pressure drop across the diaphragm 22. The force required to close the diaphragm valve is therefore greatly reduced. For any applied force on the piston 4, the damping effect is at a maximum when there is an applied voltage and at a minimum when there is no applied voltage, the degree of damping being determined by the annular passage 16, the bypass passage 39 and the diaphragm valve. If the voltage is pulsed on and off during the application of a sufficiently large force, the diaphragm valve will oscillate between its closed and open positions, respectively. The level of the damping effect can therefore be controlled by the respective lengths of the "on" and "off" pulses, and will be between the minimum and maximum value for any applied force, having regard to the cross-sectional areas and lengths of the bypass passage 39 and the annular passage 16. A smaller applied force may not be sufficient to close the diaphragm valve even when a voltage is applied across the electrodes 8 and 18, because there is not a sufficient pressure drop across the diaphragm 22. In this case, the degree of damping is determined by the restriction to flow due to the bypass passage 39, annular passage 16 and partially open diaphragm valve.

When the force on the piston 4 is released, the action of the spring will return the piston 4 to its original position. This causes a pressure increase in the return passage 60 which opens the flap-valve member 38 and allows ER fluid to flow past the piston 4 via chamber 43, annular passage 16 and port 12 now acting as an outlet port. Additionally some ER fluid can flow back through the valve assembly from port 14, now acting as an inlet port, to the port 12 via the hollow boss 36, the now-open diaphragm valve and the passage 39, the chamber 43 and the annular passage 16. The damping effect in this direction is thus much reduced. If desired, a pulsing field may be applied to the ER fluid returning through the passage 16.

In the modification illustrated in FIG 1a, the inner rim 18b of the annular electrode 18 has a convexly curved surface 18c disposed towards the diaphragm 22.

In use, as the diaphragm 22 deforms towards the inner rim 18b, the area of contact between the surface 18c of the inner rim 18b and the diaphragm 22 moves inwardly with respect to the diaphragm 22. This has the effect of reducing the effective diameter of the diaphragm 22 and so its stiffness or resistance to deformation is increased. This alters the closing characteristics of the diaphragm valve. The shape of the curved surface 18c can thus be chosen to achieve the desired characteristics.

Referring now to FIG. 2, parts which are similar to those of the embodiment of FIG. 1 are accorded the same reference numerals. An embodiment of a damper according to the invention is shown in which a pair of flow-control valve assemblies, which are in effect mirror images of each other, are defined by piston 4 within the cylinder 2, so as to be able to control flow of an ER fluid bidirectionally. The piston 4 comprises female and male piston elements 4A and 4B. The female element 4A is cup shaped and is internally screw-threaded so as to be able to engage externally screw-threaded male element 4B. The outer wall of the female piston elements 4A defines annular electrode 18. A chamber is defined internally of the engaged piston elements 4A and 4B in which the diaphragm 22 is located, said diaphragm 22 separating the chamber into two common chambers 27 and 127.

The elements forming one of the flow-control valve assemblies will now be described. The other flow-control valve assembly is similarly constructed and for clarity corresponding parts are similarly labelled but in the 100 series. Leakage of fluid around the diaphragm 22 is prevented by O-ring 20 which is sealingly in contact with the diaphragm 22 and a seating recess defined by a flange 50 and inner rim 52 of element 4A. Associated with chamber 127 is a circular plate 54 serving the function of boss region 36c of FIG. 1. The plate 54 has a hole defining outlet passage 45 of the diaphragm valve in a thicker semi-circular region 54a and a hole defining bypass passage 39 in a thinner semicircular region 54b. The plate 54 is stepped in such a way that the thinner region 54b, and hence the bypass passage 39, is further from the diaphragm 22 than the thicker region 54a so that it can never be closed by the diaphragm 22. The diaphragm 22 is equidistant from plates 54 and 154 so that pressure on either side can deform it so as to close the adjacent end of outlet passage 45 or 145 completely.

An internally screw threaded annular sleeve portion 56 of the piston element 4A extends so as to abut support plate 30 which is secured to the annular sleeve portion 56 by engagement with an externally screw-threaded piston rod 66. The rod 66 has a peripheral axial groove 66a which extends out of the piston 4. The entrance to the passage formed by the groove 66a and the plate 30 defines port 14. Insulating member 32 and support plate 30 are provided with communicating holes defining flow passage 60 and port 112. Flap-valve member 38 is held between the insulating member 32 and piston element 4A by a stepped region 64 of the latter, and covers the flow passage 60 at the diaphragm-adjacent end of the latter. On the opposite side of the piston 4, an internally screw-threaded annular sleeve portion 156, extending from piston element 4B, is engaged with a screw-threaded spigot 158 having a passage therethrough, the flared entrance to which defines port 114. The spigot 158 secures the corresponding parts in a similar manner to the piston rod 66.

In use, when the piston 4 moves in the direction of arrow B, ER fluid passes into the piston 4 via ports 12 and 114, with the port 12 acting as the primary inlet port. Passage of ER fluid from flow passage 160 into chamber 143 is enabled by opening of a flap valve defined by the end of flow passage 160 remote from port 12 and the flap-valve member 138. A corresponding flap valve, defined by the end of flow passage 60 remote from port 112 and the flap-valve member 38, remains closed, thus ensuring that fluid is directed into common chamber 127 after passing through annular passage 16. The shape of plate 54 is such that, when the diaphragm 22 deforms to cover the outlet passage 45 of plate 54, the bypass passage 39 remains open and so allows flow between the annular passage 16 and port 14, acting as the outlet port. It is to be understood that the damping characteristics of this damper are determined by the same principles explained in connection with the damper shown in FIG. 1.

When the piston 4 moves in the opposite direction, port 112 acts as the primary inlet port and flow is controlled in an analogous manner by the corresponding parts through the second flow control valve assembly, with fluid exiting the piston 4 through the port 114.

Referring now to FIG. 3, the complete damper illustrated in part in FIG. 2 is shown and the same parts are accorded the same reference numerals. On the piston rod side of the piston 4, ER fluid is maintained in the cylinder 2 by an annular seal 68 extending around the piston rod 66, which in turn is held in place by an end cap 70a and a snap ring 72. On the opposite side of the piston 4, the cylinder 2 is sealed by a welded-on end cap 70b fitted internally with a rubber stop 74. A number of O-rings 76 serve to seal the electrode 8 and insulating sleeve 10 within the cylinder 2 and prevent leakage of fluid. The end of the piston rod 66 extending out of the cylinder 2 and the end cap 70b are provided with annular fixing regions 78 which can be used to secure a mechanical device for which damping is required.

Figure 4:
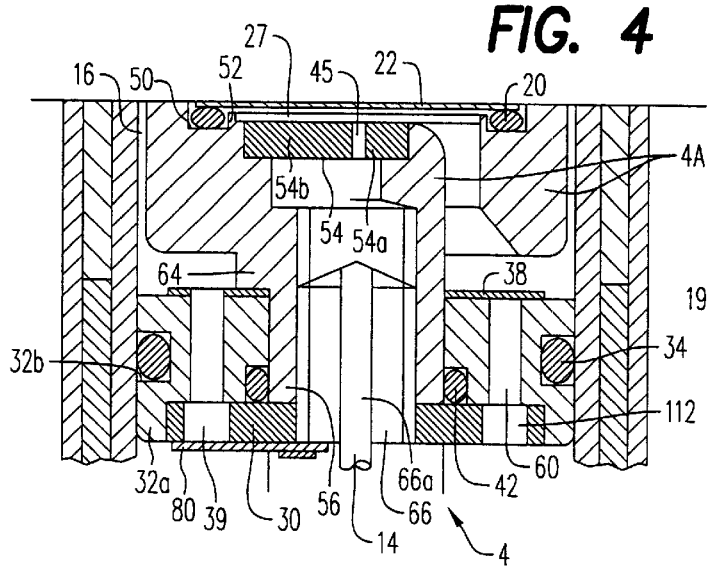
FIG. 4 is an axial section of a further embodiment of a bidirectional damper according to the present invention.

Referring now to FIG. 4, a modification of the bidirectional damper of FIG. 2 is shown in part, wherein plate 54 is of uniform thickness and contains only the single hole 45. Bypass passage 39 is now located outside of piston element 4A and passes through flap-valve member 38, insulating member 32 and support plate 30. A cantilevered spring flap 80 ensures that the bypass passage 39 remains closed, so maintaining flow through chamber 127, until the diaphragm 22 (shown in part) becomes closed. Subsequent pressure increase will force the spring flap 80 to open at a pressure determined by the strength of the spring. One or both sides of the piston 4 shown in FIG. 2 may be modified in this way.

Figure 5:
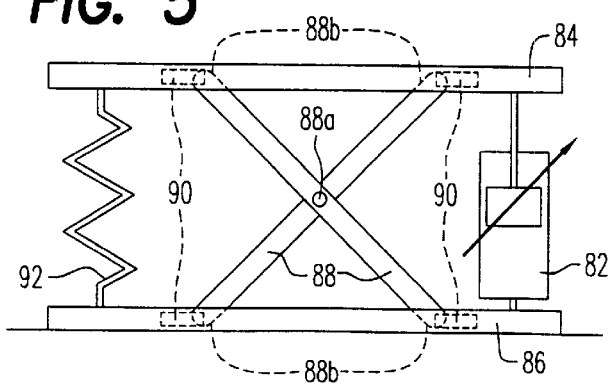
FIG. 5 is a schematic representation of a seat assembly incorporating a bidirectional damper according to the present invention.

FIG. 5 is a schematic representation of a seat assembly incorporating a bidirectional damper 82 according to the present invention. A seat 84 is secured to a base 86 by two pairs of scissor-action metal struts 88 (only one pair shown) located at opposite ends of the seat 84. At each securing point, ends 88b of struts 88 are secured so as to be slidable in a channel 90. The two struts 88 comprising each pair are pivotally secured to each other at their midpoints 88a. The damper 82 according to the present invention and a compression spring 92 are disposed between and secured to the seat 84 and the base 86.

In use, the seat assembly shown will form part of a vehicle in which significant forces are normally transmitted to the seat, for example in an agricultural vehicle. When a force is applied to the seat assembly which compresses the spring 92, the ends 88b of the metal struts 88 slide outwards in the channels 90 and the struts 88 pivot about their midpoint 88a, allowing the seat 84 to move towards the base 86. Damping of this force is effected by the damper 82 in a manner as described above. When the force is removed, the compressed spring 92 urges the seat 84 away from the base 86 and the metal struts 88 pivot about their midpoint 88a and the ends 88b slide inwards in the channels 90. The force of the spring 92 is also damped by the bidirectional damper 82.

Figure 6:
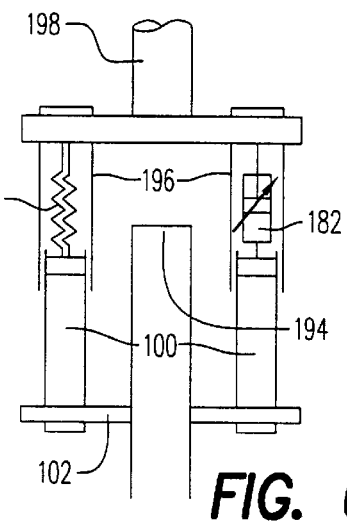
FIG. 6 is a schematic representation of a fork-suspension unit of a bicycle incorporating a damper according to the present invention.

Referring now to FIG. 6, a unidirectional damper 182 of the type described in FIG. 1 and compression spring 192 are disposed on opposite sides of a wheel 194 within respective upper tubes 196 of a telescopic suspension fork of a bicycle frame 198. Each of the damper 182 and spring 192 is anchored at one end to the frame and at the other to a respective lower tube 100 which is slidable within a respective one of the upper tubes 196. The lower tubes 100 carry a spindle 102a of a wheel 194. Damping is effected in the manner already described.

Figure 7:
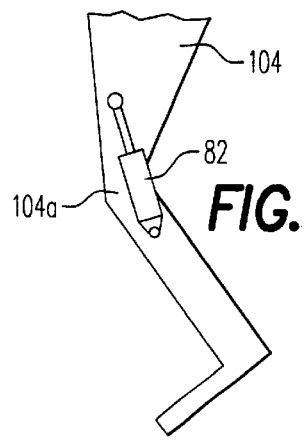
FIG. 7 is a schematic representation of a prosthetic leg incorporating a damper according to the present invention.

FIG. 7 is a representation of a prosthetic leg 104 in which a bidirectional damper 82 is anchored above and below the knee 104a so as to provide damping of the forces produced when the leg 104 impacts the ground, for example when walking.

In the dampers described above in relation to FIGS. 1, 2 and 3, the damping force is approximately proportional to the square of the velocity of the damper and the rate of change of damping force, at a given velocity, is very non-linear with applied field.

In some instances, it is preferable to change these characteristics and preferably to linearise either or both of them. To achieve this, an arrangement of the type described above with reference to FIG. 4 may be utilised. Thus, the above-described by-pass passage may be controlled defined by at least one hole provided with a cantilevered spring flap or other resiliently-biassed closure means defining a pressure-relief valve. In the case of a single hole, the resiliently-biassed closure means may be provided by a simple cantilever blade spring which is biassed into a position in which it closes the hole. In the case of a series of holes, the resiliently-biassed closure means may be provided by circular disk springs. The characteristics of the closure means, for example the dimensions of the springs, width, length and thickness or outer diameter, inner diameter and thickness in the case of cantilever springs, dictate the pressure required to open the spring or springs and hence control the shape of the force/velocity profile.

Figure 8:
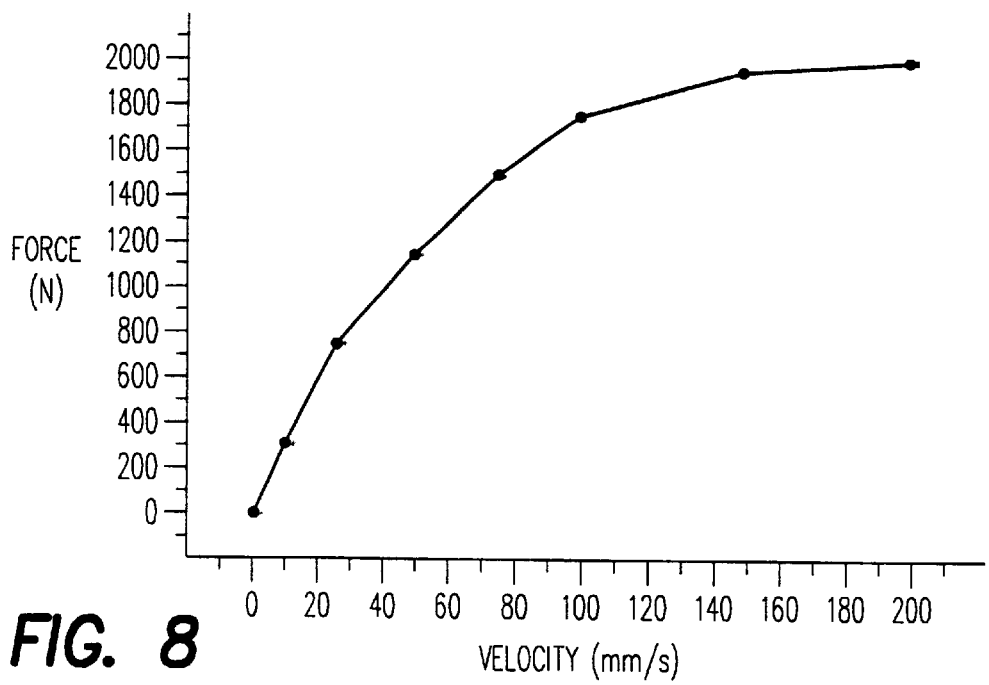
FIGS. 8 and 9 are graphs plotting force against velocity for modified damper assemblies according to the present invention.
Figure 9:
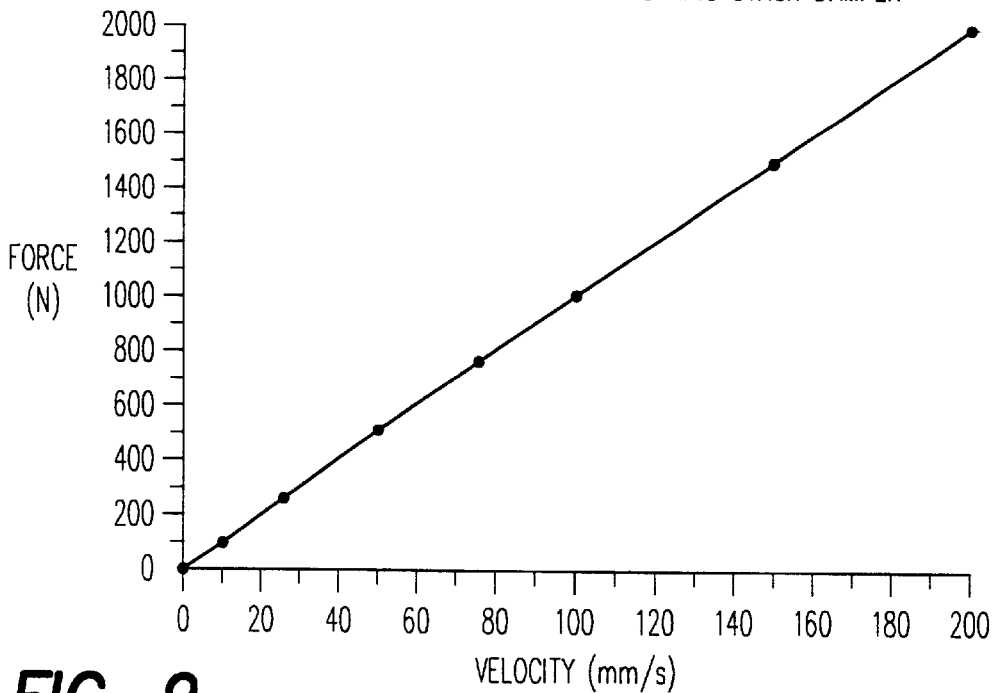

In a preferred arrangement, the characteristic aimed for is one of an initially stiff spring that opens slowly and becomes progressively weaker. The force versus velocity characteristic can then become as illustrated in accompanying FIG. 8. This force can then be linearised by replacing the single spring with a series of springs having different spring characteristics. This enables the curve to be linearised as illustrated in accompanying FIG. 9.

In a similar fashion, a series of holes forming the by-pass passage can be covered with a disk spring, or a series of disk springs. The advantage of the disk springs is that they are easier to locate in relation to the holes and the rest of the damper.

In order to provide a more linear rate of change of damper force at a given velocity, the diaphragm assembly has deflection characteristics which are better linearised with applied field. In such diaphragm assembly the deflection characteristic stiffens with deflection.

Figure 10:
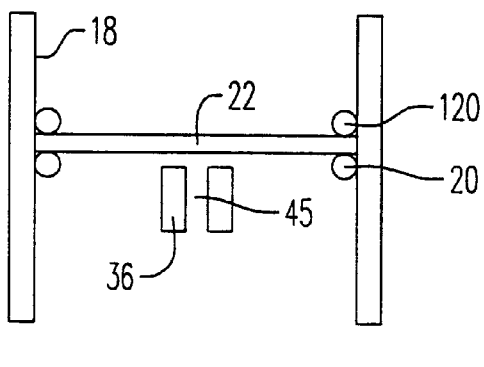
FIGS. 10 to 13 are schematic views of modified diaphragm assemblies for use in dampers according to the present invention.
Figure 11:
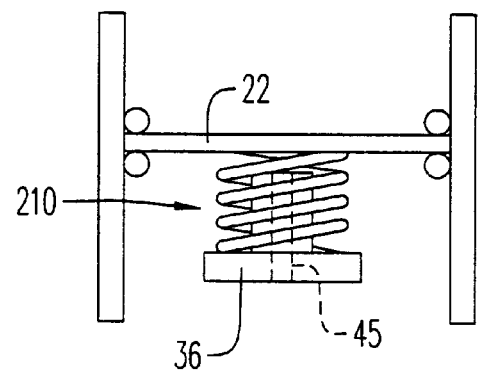

This can be achieved in a number of ways. An arrangement of the type described above with reference to FIG. 1a may be provided. Alternatively, the flexible diaphragm can be replaced with a rigid metal diaphragm and the required deflection achieved by supporting the diaphragm on an elastomeric support forming part of the assembly. For example, as shown in FIG. 10, the O-rings 20 and 120 upon which the diaphragm 22 is seated may be formed of a soft sealing material providing flexible sealing supports. Instead of the diaphragm 22 being formed of rigid metal, a semi-flexible diaphragm 22 may be used with elastomeric O-rings 20 and 120. Instead of using O-rings, other sealing geometries are equally suitable, for example quad rings (also known as X-rings), delta rings or square section rings can alternatively be employed.

The Young's Modulus of the diaphragm support is dictated by the hardness of the elastomeric material of construction thereof. This can be used to control deflection of the support. By careful selection of the material of construction of the ring or other resilient support for the diaphragm, it is possible to generate a stiffening spring thereby to reduce the non-linearities inherent in an ordinary flexible diaphragm.

The use of a semi-flexible diaphragm and elastomeric support enables a stiffer diaphragm to be used in conjunction with softer elastomeric O-rings or other supports to develop a range of controllable characteristics.

In accompanying FIG. 1, an alternative arrangement is illustrated wherein the effective stiffness of the diaphragm 22 is controlled by use of a supporting spring element 210 which may be a compression, conical or disk spring (eg a Belleville washer spring) and which may be mounted so as to surround boss 36 in which outlet passage 45 is formed.

In some instances, it is desirable to have one direction of movement of the damper electronically controlled and the other mechanically adjustable. This can be achieved by employing a needle valve 220 as illustrated in FIG. 12 or an adjustable end stop 230 as illustrated in FIG. 13.

Figure 12:
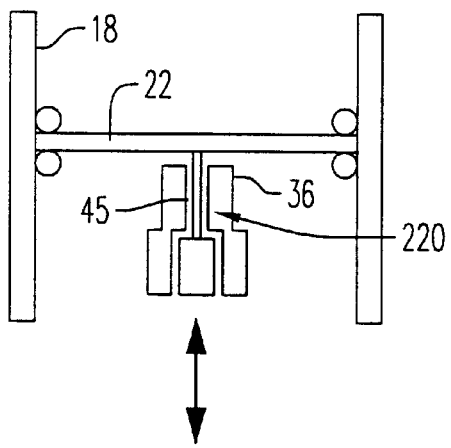

In FIG. 12, the needle valve 220 operates by varying the orifice size of the passage 45. The needle valve may be a tapered needle in a plain hole or a plain needle in a tapered hole.

Figure 13:
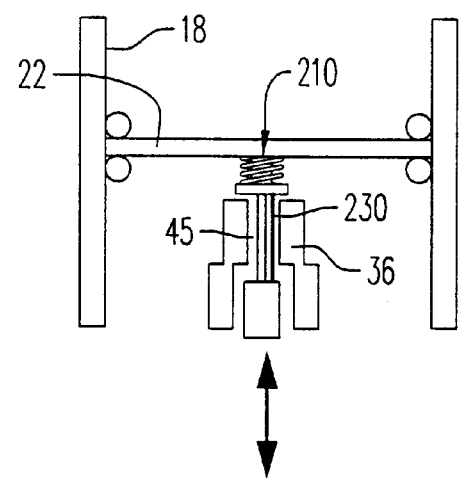

Alternatively and as shown in FIG. 13, deflection of the diaphragm 22 can be limited by using the adjustable end stop 230 which takes the form of a needle. In this case, the diaphragm 22 deflects to a given amount, controlled by the pressure drop across the diaphragm 22, before its deflection is stopped by the end stop 230. In FIG. 13, the deflection of the diaphragm 22 is additionally controlled by compression spring 210 interposed between the end stop 230 and the diaphragm 22.

In all of the above embodiments, the diaphragm 22 is formed of an isotropic material. It is, however, within the scope of the present invention for the diaphragm to be formed of an anisotropic material, for example a variable modulus polymer material, permitting the material to have a stiffness which varies radially of the diaphragm, thereby enabling variable deflection characteristics to be achieved without the need to provide the previously described external means for mechanically varying the deflection characteristics of the diaphragm.

What is claimed is:

1. A flow-control valve assembly for an FR fluid, said valve assembly comprising:

an inlet port;

an outlet port;

a flow path for the FR fluid extending between the inlet and outlet ports;

a flow-control valve disposed in the flow path between the ports, said flow-control valve including a valve member and a seating surface, the valve member being moveable between a first position in which the valve is open and the valve member is spaced from the seating surface, and a second position in which the valve is closed and the valve member is in engagement with the seating surface;

a flow restrictor disposed in the flow path upstream of the flow-control valve, said flow restrictor including means for applying a field to the FR fluid as it passes through the flow restrictor to enable control of the resistance to flow of the FR fluid therethrough, so as to affect a pressure drop across the valve member, and thereby to control movement of the valve member between its first and second positions; and a bypass passage independent of the flow-control valve defining a pressure-relief means, which can permit flow between the inlet and outlet ports when the valve member is in the second position, said bypass passage being disposed downstream of the flow restrictor and spaced from the seating surface.

2. A valve assembly as claimed in claim 1, wherein the FR fluid is an MR fluid, and the means for applying a field includes an electromagnet, and means for adjusting the current passing through the electromagnet whereby to apply a magnetic field of varying intensity to the MR fluid in use.

3. A valve assembly as claimed in claim 1, wherein the means for applying a field is arranged so as to apply a pulsed field.

4. A valve assembly as claimed in claim 1, wherein the valve member is a resilient diaphragm.

5. A valve assembly as claimed in claim 4, additionally comprising means for varying the resistance to movement of the valve member.

6. A valve assembly as claimed in claim 5, wherein the means for varying the resistance to movement comprises a diaphragm support which is shaped so that, in use, the effective diameter of the diaphragm is changed as it is deformed.

7. A valve assembly as claimed in claim 5, wherein the means for varying the resistance to movement includes means acting upon the valve member to oppose movement thereof.

8. A valve assembly as claimed in claim 1, wherein the bypass passage incorporate a pressure-relief valve to enable flow through the bypass passage to be controlled.

9. A damper comprising a cylinder in which a piston with piston rod is slidable, an FR fluid-flow passage interconnecting opposite sides of the piston, and a flow-control valve assembly controlling flow of FR fluid through said fluid-flow passage, wherein the flow-control valve assembly is as claimed in claim 1.

10. A damper as claimed in claim 9, wherein said piston incorporates said flow-control valve assembly.

11. A damper as claimed in claim 9, including first and second flow-control valve assemblies adjacently disposed and orientated so that they respectively control flow of FR fluid through said fluid-flow passage in opposite directions.

12. A damper as claimed in claim 11, wherein each of said flow-control valve assemblies includes a one-way valve disposed so as to permit flow into the FR fluid-flow passage.

13. A damper as claimed in claim 11, wherein said flow-control valve assemblies share a common valve member.

14. A damper as claimed in claim 13, wherein the common valve member is a resilient diaphragm which is moveable between a first position in which both flow-control valves are open, and second and third positions in which only the first flow-control valve is open and only the second flow-control valve is open, respectively.

15. A damper comprising a cylinder in which a piston with a piston rod is slidable, an FR fluid-flow passage interconnecting opposite sides of the piston, and first and second flow-control valve assemblies adjacently disposed and oriented so that they respectively control flow of FR fluid through said fluid-flow passage in opposite directions, wherein each of said first and second flow-control valve assemblies comprises:

an inlet port;

an outlet port;

a flow path for the FR fluid extending between the inlet and outlet ports;

a flow-control valve disposed in the flow path between the ports, said flow-control valve including a valve member which is moveable between a first position in which the valve is open, and a second position in which the valve is closed;

a flow restrictor disposed in the flow path upstream of the flow-control valve, said flow restrictor including means for applying a field to the FR fluid as it passes through the flow restrictor to enable control of the resistance to flow of the FR fluid therethrough, so as to affect a pressure drop across the valve member, and thereby to control movement of the valve member between it s first and second positions; and a bypass passage defining a pressure-relief means, which can permit flow between the inlet and outlet ports when the valve member is in the second position, said bypass passage being disposed downstream of the flow restrictor.

\* \* \* \* \*